(12) United States Patent
Bin

(10) Patent No.: US 9,867,362 B2
(45) Date of Patent: *Jan. 16, 2018

(54) SIDE LEAKAGE PREVENTION PET URINAL PAD

(71) Applicant: Jiangsu Zhongheng Pet Articles Joint-Stock Co., Ltd., Jiangsu (CN)

(72) Inventor: Qiu Bin, Jiangsu (CN)

(73) Assignee: Jiangsu Zhongheng Pet Articles Joint-Stock Co., Ltd., Jiangsu (CN)

( * ) Notice: Subject to any disclaimer, the term of this patent is extended or adjusted under 35 U.S.C. 154(b) by 66 days.

This patent is subject to a terminal disclaimer.

(21) Appl. No.: 14/950,917

(22) Filed: Nov. 24, 2015

(65) Prior Publication Data

US 2016/0143248 A1 May 26, 2016

(30) Foreign Application Priority Data

Nov. 26, 2014 (CN) .................... 2014 2 0725171 U

(51) Int. Cl.
*A01K 1/015* (2006.01)

(52) U.S. Cl.
CPC .......... *A01K 1/0157* (2013.01); *A01K 1/0152* (2013.01); *A01K 1/0155* (2013.01)

(58) Field of Classification Search
CPC .. A01K 1/0155; A01K 1/0157; A01K 1/0152; A01K 1/0154; A01K 1/0107; A61F 13/15; A61F 13/47; A61F 13/475; A61F 13/4751; A61F 13/4756; A61F 13/4758; A61F 13/51; A61F 13/511; A61F 13/51104; A61F 13/51121; A61F 13/514; A61F 13/51401; A61F 13/53; A61F 2013/15186

USPC ................. 119/169, 161, 167, 170, 171, 172
See application file for complete search history.

(56) References Cited

U.S. PATENT DOCUMENTS

| | | | | |
|---|---|---|---|---|
| 3,284,273 A | * | 11/1966 | Prentice | A61F 5/485 119/169 |
| 6,244,216 B1 | * | 6/2001 | Ochi | A01K 1/0107 119/169 |
| 6,460,484 B2 | * | 10/2002 | Ikegami | A01K 1/0107 119/161 |
| 2005/0166856 A1 | * | 8/2005 | Kaneko | A01K 1/0107 119/169 |
| 2009/0000557 A1 | * | 1/2009 | Takahashi | A01K 1/0157 119/161 |
| 2011/0146581 A1 | * | 6/2011 | Sasano | A01K 1/0107 119/171 |

(Continued)

*Primary Examiner* — Trinh Nguyen
(74) *Attorney, Agent, or Firm* — Osha Liang LLP

(57) ABSTRACT

A leakage-prevention pet urinal pad includes a urinal pad body having a stratiform structure that includes: a non-woven fabric coating layer; an absorbing layer arranged below the non-woven fabric coating layer; a PE film leakage prevention layer arranged below the absorbing layer; and a toilet paper absorbing layer arranged between the PE film leakage prevention layer and the absorbing layer, wherein the absorbing layer includes two parts: a first absorbing layer arranged in a middle section of the urinal pad body and having a lower expansivity, and a second absorbing layer arranged at a periphery of the urinal pad body around the first absorbing layer and having a higher expansivity, thereby after absorbing water, the second absorbing layer becomes thicker than the first absorbing layer.

4 Claims, 1 Drawing Sheet

(56) References Cited

U.S. PATENT DOCUMENTS

| | | | | |
|---|---|---|---|---|
| 2015/0150212 A1* | 6/2015 | Takagi | ................ | A01K 1/0107 119/161 |
| 2015/0164041 A1* | 6/2015 | Takahashi | ............ | A01K 1/0107 119/161 |
| 2015/0201579 A1* | 7/2015 | Takagi | ................ | A01K 1/0107 119/171 |
| 2015/0320009 A1* | 11/2015 | Sasano | ................ | A01K 1/0157 119/161 |
| 2015/0334985 A1* | 11/2015 | Takahashi | ............ | A01K 1/0157 119/171 |
| 2016/0338313 A1* | 11/2016 | Hasegawa | ............ | A01K 1/0107 |

* cited by examiner

SIDE LEAKAGE PREVENTION PET URINAL PAD

CROSS-REFERENCE TO RELATED APPLICATIONS

This Application claims priority for Chinese Patent Application No. CN201420725171.6, filed on Nov. 26, 2014, the disclosure of which is incorporated by reference in its entirety.

TECHNICAL FIELD

The invention relates to a pet urinal mat, and more particularly, to a side leakage prevention pet urinal pad, which belongs to the technical field of pet products.

BACKGROUND ART

Presently, with the improvement in people's living standards, pets like cats, dogs or the like have entered the lives of people, playing an increasingly important role. People are also demanding more for the sanitation of the pets. But in daily lives, it is very troublesome to dispose of pet excreta. The task requires the pet masters to pay much attention. To protect environments and also create a more comfortable habitat for the pets to meet the animal right demands of the pets, and meanwhile reduce the tedious work of people for sweeping the pets, quite a number of people have used pet urinal mats while keeping pets. The existing pet urinal mats typically include a non-woven fabric surface coating layer. An absorbing layer formed by mixing of wood pulp, PP fibers and super absorbent materials is arranged below the non-woven fabric surface coating layer, and a PE film bottom leakage-prevention layer is arranged on the external side of the absorbing layer. However, the edge portions of existing pet urinal pads are sections of non-woven fabric surface coating layers. During use, the edges of the urinal pads are prone to leak when the urine volume is large. In addition, the absorption efficiency of the existing leakage prevention pet urinal pad is not ideal as well.

SUMMARY OF THE INVENTION

An object of the present invention is to provide side leakage-prevention pet urinal pads that can effectively prevent pet urine from leaking from the side, so as to solve the foregoing problems in the prior art.

To solve the foregoing technical problem, the present invention employs a technical scheme as follows:

A leakage prevention pet urinal pad, wherein a urinal pad body is a stratiform structure, which includes: a non-woven fabric coating layer, an absorbing layer below the coating layer and a PE film leakage prevention layer below the absorbing layer; a toilet paper absorbing layer is also arranged between the leakage prevention layer and the absorbing layer; the absorbing layer is composed of two parts: a first absorbing layer arranged in the middle position of the urinal pad body and having a lower expansivity and a second absorbing layer arranged on the periphery of the first absorbing layer and having a higher expansivity; and the second absorbing layer after absorbing water is higher than the first absorbing layer A leakage-prevention pet urinal pad comprises a urinal pad body having a stratiform (layered) structure, which includes: a non-woven fabric coating layer, an absorbing layer below the coating layer, and a PE film leakage-prevention layer below the absorbing layer; a toilet paper absorbing layer is also arranged between the PE leakage-prevention layer and the absorbing layer; the absorbing layer comprises two parts: a first absorbing layer in the middle of the urinal pad body and having a lower expansivity, and a second absorbing layer arranged at the periphery of the first absorbing layer and having a higher expansivity; and the second absorbing layer after absorbing water is higher (thicker) than the first absorbing layer.

In view of the desired absorption effects, the second absorbing layer is a fast absorbing layer which is formed by mixing wood pulp, PP fiber and fast absorption super absorbent molecule materials, and the first absorbing layer is a common absorbing layer which is formed by mixing wood pulp, PP fiber and common super absorbent molecule materials.

The absorptive amount of the common super absorbent molecules according to embodiments of the present invention can absorb 39° C., 0.9% saline water at 48 g/g, and the saline water absorption speed is 3 g/s. The absorptive amount of the fast super absorbent molecules can absorb 39° C., 0.9% saline water at 58 g/g, and the saline water absorption speed is 6 g/s.

To make the pet urinal pad have better absorption effects, a plurality of absorption holes may be uniformly arranged on the coating layer at positions corresponding to the first absorbing layer.

The upper layer of the coating layer at positions corresponding to the mixed absorbing layer may be provided with an embossing layer.

The present invention has the following advantageous effects: because the second absorbing layer absorbs quickly and has high expansion coefficients, when the second absorbing layer arranged at the periphery of the first absorbing layer quickly absorbs pet urine, raised (thicker) edges are formed at the periphery of the pet urinal pad and a recess (depression) is formed in the middle of the pet urinal pad to effectively prevent the pet urine from leaking from the sides if the volume of the pet urine is too large to be quickly absorbed.

In the figures, structures of other parts that do not play a role of absorbing water are omitted.

In the figures: 1 refers to a coating layer, 2 refers to a first absorbing layer, 3 refers to a second absorbing layer, 4 refers to a toilet paper absorbing layer, 5 refers to a leakage prevention layer, and 6 refers to an embossing layer.

DETAILED DESCRIPTION OF THE PREFERRED EMBODIMENTS

The technical characteristics of the invention will be described in details hereinafter with references to the drawings and embodiments.

Figure 1:
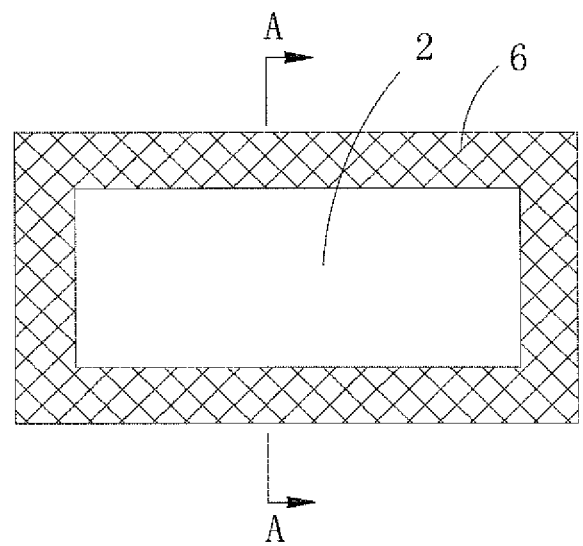
FIG. 1 shows a structure diagram showing a leakage prevention pet urinal pad of the utility model.
Figure 2:
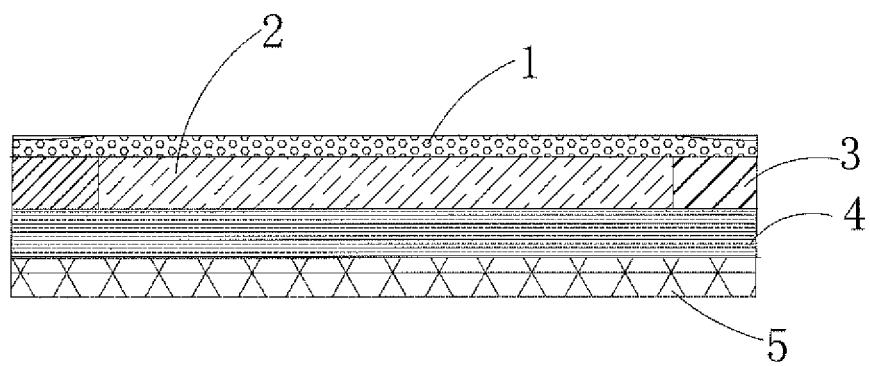
FIG. 2 shows a cross sectional view of the structure along the A-A section line in FIG. 1.
Figure 3:
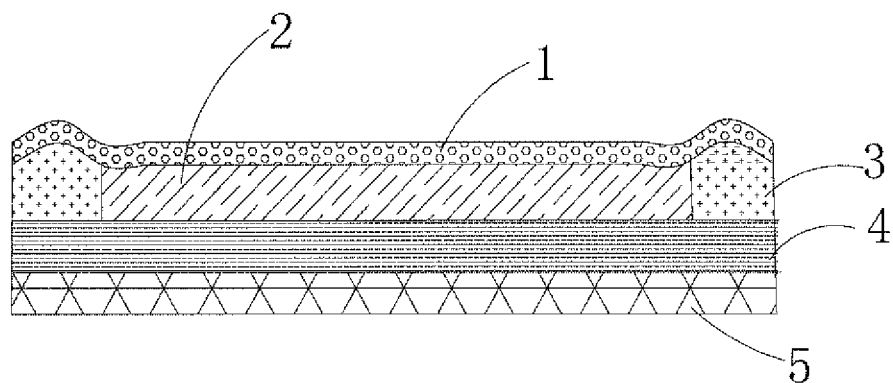
FIG. 3 shows a cross sectional structure diagram after the urinal pad absorbs water.

According to a leakage-prevention pet urinal pad as shown in FIG. 1, FIG. 2, and FIG. 3, a urinal pad body has a stratiform (layered) structure, which includes: a non-woven fabric coating layer 1, an absorbing layer below the coating layer 1 and a PE film leakage prevention layer 5 below the absorbing layer, wherein a toilet paper absorbing layer 4 is also arranged between the PE film leakage prevention layer 5 and the absorbing layer; the absorbing layer comprises two parts: a first absorbing layer 2 arranged in the middle position of the urinal pad body and having a lower expansivity (expansion coefficient upon liquid absorption), and a second absorbing layer 3 arranged at the periphery around the first absorbing layer 2 and having a higher expansivity; and the second absorbing layer 3 after absorbing water becomes thicker (higher) than the first absorbing layer 2.

In view of the desired absorption effects, the second absorbing layer is a fast absorbing layer, which is formed by mixing wood pulp, PP fiber and fast absorption super absorbent molecule materials. The first absorbing layer is a regular absorbing layer, which is formed by mixing wood pulp, PP fiber and common super absorbent molecule materials.

The absorptive amount of the common super absorbent molecules according to embodiments of the invention can absorb 39° C., 0.9% saline water at an amount of 48 g/g, and the saline water absorption speed (rate) is 3 g/s. The absorptive amount of the fast super absorbent molecules can absorb 39° C., 0.9% saline water at an amount of 58 g/g, and the saline water absorption speed (rate) is 6 g/s.

The upper layer of the coating layer at the position of (above) the second absorbing layer 3 may be provided with an embossing layer 6.

To make the pet urinal pad having better absorption effects, a plurality of absorption holes may be uniformly arranged on the coating layer 1 at positions corresponding to (above) the location of the first absorbing layer 2.

The upper layer of the coating layer 1 at positions corresponding to the second absorbing layer 3 may be provided with an embossing layer 6.

During use, because the second absorbing layer 3 absorbs fast and has higher expansion coefficients, when the second absorbing layer 3 arranged on the periphery fast absorbs pet urine, raised edges are formed at the periphery of the pet urinal pad, and a recess (depression) is formed in the middle section of the pet urinal pad due to the slower absorption and lower expansion coefficients of first absorbing layer 2. Therefore, the pet urine can be effectively prevented from leaking from the sides when the pet urine volume is too large to be quickly absorbed.

What is claimed is:

1. A leakage prevention pet urinal pad, comprising a urinal pad body having a stratiform structure, comprising:
   a non-woven fabric coating layer;
   an absorbing layer arranged below the non-woven fabric coating layer;
   a PE film leakage prevention layer arranged below the absorbing layer;
   wherein the absorbing layer comprises two parts:
     a first absorbing layer arranged in a middle section of the urinal pad body and having a first expansivity, and
     a second absorbing layer arranged at a periphery of the urinal pad body around the first absorbing layer and having a second expansivity, thereby after absorbing water, the second absorbing layer becomes thicker than the first absorbing layer,
     wherein the first expansivity is lower than the second expansivity, and
     wherein a toilet paper absorbing layer is arranged above the PE film leakage-prevention layer and below the absorbing layer.

2. The leakage prevention pet urinal pad according to claim 1, wherein outer edges of the mixed absorbing layer, the coating layer, the leakage prevention layer and the toilet paper absorbing layer stack together.

3. The leakage prevention pet urinal pad according to claim 1, wherein a plurality of absorption holes are uniformly arranged on the coating layer at locations above the first absorbing layer.

4. The leakage prevention pet urinal pad according to claim 1, wherein an upper layer of the coating layer at a location above the second absorbing layer is provided with an embossing layer.

* * * * *